(12) United States Patent
Crawford et al.

(10) Patent No.: US 9,371,934 B2
(45) Date of Patent: Jun. 21, 2016

(54) FORCE MULTIPLYING SOLENOID VALVE

(75) Inventors: Paul A. Crawford, Houston, TX (US); William H. Garner, Houston, TX (US)

(73) Assignee: FMC Technologies, Inc., Houston, TX (US)

( * ) Notice: Subject to any disclaimer, the term of this patent is extended or adjusted under 35 U.S.C. 154(b) by 85 days.

(21) Appl. No.: 14/374,166

(22) PCT Filed: Jan. 23, 2012

(86) PCT No.: PCT/US2012/022208
§ 371 (c)(1),
(2), (4) Date: Jul. 23, 2014

(87) PCT Pub. No.: WO2013/112128
PCT Pub. Date: Aug. 1, 2013

(65) Prior Publication Data
US 2015/0034187 A1    Feb. 5, 2015

(51) Int. Cl.
*F16K 31/10*    (2006.01)
*F16K 31/122*    (2006.01)
*F16K 31/06*    (2006.01)
*F16K 37/00*    (2006.01)

(52) U.S. Cl.
CPC .............. *F16K 31/0686* (2013.01); *F16K 31/06* (2013.01); *F16K 31/10* (2013.01); *F16K 31/122* (2013.01); *F16K 37/0008* (2013.01); *Y10T 29/49412* (2015.01); *Y10T 137/8275* (2015.04)

(58) Field of Classification Search
CPC .... F16K 31/10; F16K 31/122; F16K 31/1221
USPC .............. 251/129.01–1, 129.15–22; 137/556, 137/556.3
See application file for complete search history.

(56) References Cited

U.S. PATENT DOCUMENTS

| 1,822,668 | A | * | 9/1931 | Protzeller | ........... F16K 31/0655 137/348 |
| 3,223,112 | A | * | 12/1965 | Ashbrook | ............. F16K 31/122 137/458 |
| 4,335,743 | A | * | 6/1982 | Jones | ...................... A01J 5/048 119/14.44 |

(Continued)

FOREIGN PATENT DOCUMENTS

| DE | 199 50 224 A1 | 4/2001 |
| DE | 102 40 523 A1 | 3/2004 |

OTHER PUBLICATIONS

International Search Report for corresponding International Application No. PCT/US2012/022208, mailed Sep. 25, 2012 (2 pages).

(Continued)

*Primary Examiner* — Marina Tietjen
*Assistant Examiner* — Seth W Mackay-Smith
(74) *Attorney, Agent, or Firm* — Osha Liang LLP

(57) ABSTRACT

A solenoid actuated valve assembly includes a valve body comprising a fluid inlet and fluid outlet, a valve member disposed within the valve body, wherein a position of the valve member controls a fluid flow between the fluid inlet and fluid outlet, and a fluid chamber above the valve member, wherein the fluid chamber is fluidly isolated from the fluid inlet and outlet. The solenoid actuated valve assembly further includes a solenoid actuator coupled to the valve body comprising a solenoid plunger proximate the fluid chamber, wherein a force multiplying ratio of a surface area of the solenoid plunger exposed to the fluid chamber is at least 1.5:1.

16 Claims, 5 Drawing Sheets

(56) References Cited

U.S. PATENT DOCUMENTS

| | | | | |
|---|---|---|---|---|
| 4,385,546 A * | 5/1983 | Lee | F42B 33/005 | 86/23 |
| 4,603,832 A * | 8/1986 | Sjoquist | A01G 25/16 | 251/129.03 |
| 4,932,439 A * | 6/1990 | McAuliffe, Jr. | F16K 31/0606 | 137/625.65 |
| 4,993,456 A * | 2/1991 | Sule | F16K 7/045 | 137/554 |
| 5,074,326 A * | 12/1991 | Baker | F16K 31/0655 | 137/15.18 |
| 5,204,652 A * | 4/1993 | Baker | F16K 31/0651 | 251/129.03 |
| 5,548,263 A * | 8/1996 | Bulgatz | F01L 9/04 | 123/90.11 |
| 6,460,779 B1 * | 10/2002 | Boecking | F02M 51/0603 | 239/102.2 |
| 7,051,991 B2 * | 5/2006 | Suzuki | F16K 7/14 | 215/331 |
| 8,505,874 B2 * | 8/2013 | Shimizu | F16K 31/02 | 251/129.07 |
| 2003/0160197 A1 * | 8/2003 | Kodama | F16K 31/408 | 251/57 |
| 2005/0098748 A1 | 5/2005 | Suzuki | | |

OTHER PUBLICATIONS

Written Opinion for corresponding International Application No. PCT/US2012/022208, mailed Sep. 25, 2012 (5 pages).

Examiner's Report issued in Canadian Application No. 2,862,415; Dated Nov. 16, 2015 (4 pages).

\* cited by examiner

FORCE MULTIPLYING SOLENOID VALVE

CROSS-REFERENCE TO RELATED APPLICATIONS

This application is a National Stage application of International Patent Application No. PCT/US2012/022208, filed on Jan. 23, 2012, which is incorporated by reference in its entirety.

BACKGROUND

1. Field of the Disclosure

Embodiments disclosed herein relate generally to fluid control. In particular, embodiments disclosed herein relate to solenoid actuated valves and methods of use.

2. Background Art

Valves are typically used to regulate, direct, or control a fluid flow (e.g., gases, liquids, fluidized solids, or slurries) by opening, closing, or partially obstructing various passageways. Solenoid valves are typically electromechanical valves for use with liquid or gas. The solenoid valve is controlled by an electric current through a solenoid: in the case of a two-port valve the fluid flow is switched on or off; in the case of a three-port valve, the fluid flow is switched between the two outlet ports. Solenoid valves offer fast and safe switching, high reliability, long service life, lower power control, and compact design.

However, when faced with higher pressures, which produce valve imbalance loads that exceed the force produced by solenoid actuators, pneumatic or hydraulic actuators may be used to close the valve. Typically, valves with direct acting solenoid actuators may be limited to closing against pressures of 3,000 psi or less. For pressures above about 3,000 psi, systems to create additional force through mechanical leverage to aid the valve in closing may be required. However, these systems are typically complex, expensive, and may be subject to performance problems due to the harsh service environments such as in the well service industry.

Accordingly, there exists a need for a solenoid actuated valve assembly that is simple, cost-effective, and compact.

SUMMARY OF THE DISCLOSURE

In one aspect, embodiments disclosed herein relate to a solenoid actuated valve assembly including a valve body comprising a fluid inlet and fluid outlet, a valve member disposed within the valve body, wherein a position of the valve member controls a fluid flow between the fluid inlet and fluid outlet, and a fluid chamber above the valve member, wherein the fluid chamber is fluidly isolated from the fluid inlet and outlet. The solenoid actuated valve assembly further includes a solenoid actuator coupled to the valve body comprising a solenoid plunger proximate the fluid chamber, wherein a force multiplying ratio of a surface area of the valve member exposed to the fluid chamber to a surface area of the solenoid plunger exposed to the fluid chamber is at least 1.5:1.

In other aspects, embodiments disclosed herein relate to a method for assembling a solenoid actuated valve including providing a valve comprising a fluid inlet and fluid outlet, a valve member disposed within the valve body, wherein a position of the valve member controls a fluid flow between the fluid inlet and fluid outlet, and a fluid chamber above the valve member, wherein the fluid chamber is fluidly isolated from the fluid inlet and outlet. The method further includes providing a solenoid actuator comprising a solenoid plunger, positioning the valve member in a closed position, filling the fluid chamber with hydraulic fluid, and coupling the solenoid actuator to the valve body, wherein a stem portion of the solenoid plunger is positioned proximate the fluid chamber.

In other aspects, embodiments disclosed herein relate to a method for using a solenoid actuated valve including providing the solenoid actuated valve comprising a valve body comprising, a fluid inlet and fluid outlet, a valve member disposed within the valve body, wherein a position of the valve member controls a fluid flow between the fluid inlet and fluid outlet, and a fluid chamber above the valve member filled with hydraulic fluid, wherein the fluid chamber is fluidly isolated from the fluid inlet and outlet, and a solenoid actuator coupled to the valve body comprising a solenoid plunger proximate the fluid chamber. The method further includes providing a multiplied force against the valve member, wherein the multiplied force corresponds with a force multiplying ratio of a surface area of the valve member exposed to the fluid chamber to a surface area of the solenoid plunger exposed to the fluid chamber.

Other aspects and advantages of the invention will be apparent from the following description and the appended claims.

DETAILED DESCRIPTION

The following is directed to various exemplary embodiments of the disclosure. The embodiments disclosed should not be interpreted, or otherwise used, as limiting the scope of the disclosure, including the claims. In addition, those having ordinary skill in the art will appreciate that the following description has broad application, and the discussion of any embodiment is meant only to be exemplary of that embodiment, and not intended to suggest that the scope of the disclosure, including the claims, is limited to that embodiment.

Certain terms are used throughout the following description and claims refer to particular features or components. As those having ordinary skill in the art will appreciate, different persons may refer to the same feature or component by different names. This document does not intend to distinguish between components or features that differ in name but not function. The figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first component is coupled to a second component, that connection may be through a direct connection, or through an indirect connection via other components, devices, and connections. Further, the terms "axial" and "axially" generally mean along or parallel to a central or longitudinal axis, while the terms "radial" and "radially" generally mean perpendicular to a central longitudinal axis.

Figure 1A:
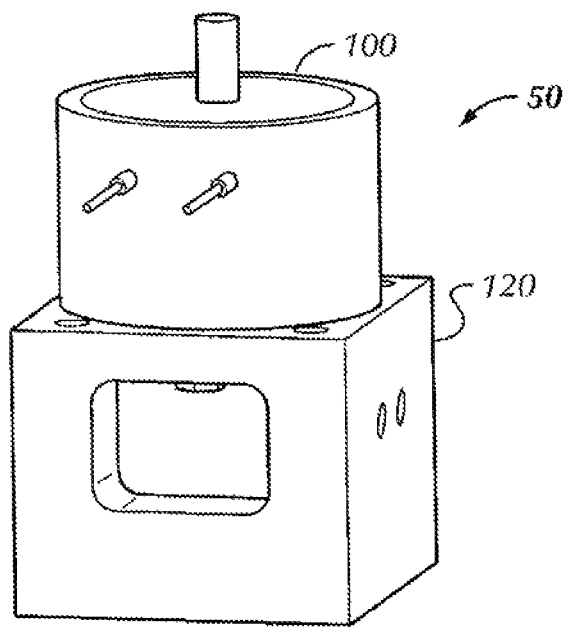
FIG. 1A illustrates an isometric view of a solenoid actuator and valve in accordance with one or more embodiments of the present disclosure.
Figure 1B:
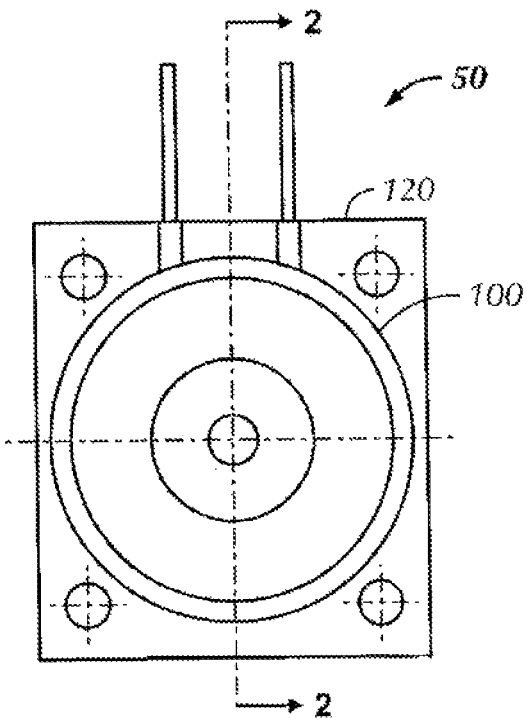
FIG. 1B illustrates a top view of the solenoid actuator and valve of FIG. 1A.
Figure 2A:
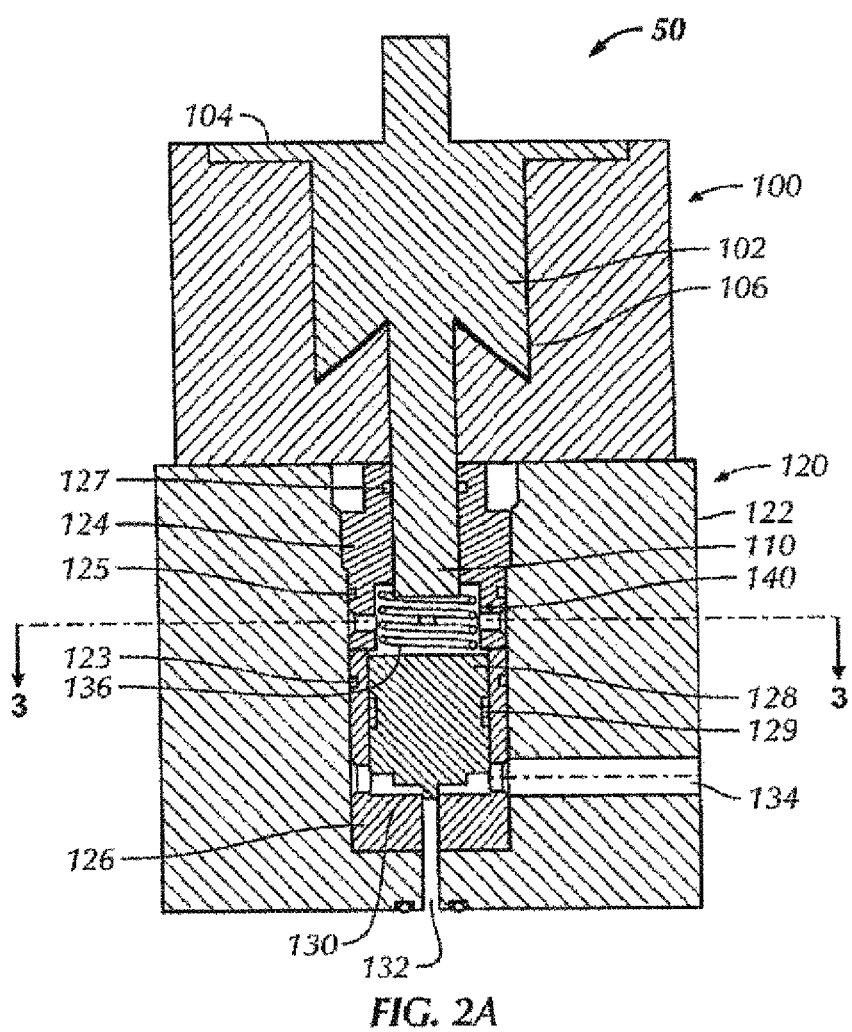
FIG. 2A illustrates a cross-section view of the solenoid actuator and valve shown in FIG. 1B in accordance with one or more embodiments of the present disclosure.

In one aspect, embodiments disclosed herein relate to force multiplying solenoid actuated valves 50 having a solenoid actuator 100 coupled to a valve 120 shown in FIGS. 1A and 1B and related methods of use. Referring to FIG. 2A, a cross-section view of a solenoid actuated valve assembly 50 in accordance with one or more embodiments of the present disclosure is shown. The valve assembly 50 includes a solenoid 100 in which a solenoid plunger 102 is disposed. The solenoid 100 may be an electromagnetic solenoid including an electromagnetically inductive coil (not shown) wound around a movable steel structure, or armature 106. As will be understood by one or ordinary skill in the art, the coil may be shaped such that the armature 106 (and the solenoid plunger 102) may be moved in and out of the solenoid 100. The solenoid 100 further includes a visual position indicator 104 disposed on an outer end of the solenoid plunger 102. The visual position indicator 104 may include a flat shoulder which also acts a stop against an outer surface of the solenoid 100. The visual indicator 104 is used to indicate whether the valve is open or closed, as will be described in more detail below.

The solenoid actuated valve assembly 50 further includes a valve 120 having a valve body 122 to which the solenoid 100 may be coupled. The solenoid 100 may be coupled to the valve body 122 with mechanical fasteners (not shown) (e.g., bolts or studs with nuts). The valve body 122 has a high pressure inlet port 132 connected to an inlet flowline (not shown) and a low pressure outlet port 134 connected to an outlet flowline (not shown) formed therein. In addition, a substantially cylindrical valve member 128 is disposed within a bore in the valve body 122. A position of the valve member 128 controls the fluid flow from the inlet port 132 through the valve body 122 to the outlet port 134.

The valve member 128 slides within a lower cage 126 in the valve body 122. The lower cage 126 may be free-floating within the valve body 122 or attached (e.g., screwed in or welded to the valve body 122). The lower cage 126 has a valve seat 130 formed in a lower surface against, which the valve member 128 seats. The bottom of the valve member 128 is forced down against the valve seat 130 when the valve 120 is closed to prevent fluid communication between the inlet port 132 and the outlet port 134. Alternatively, in other embodiments, the bottom of the valve member 128 may be forced down against a valve seat formed directly in the valve body 122 (with no lower cage installed). Seals 123 located between the lower cage 126 and wall of the valve body 122, and seals 129 located between the lower cage 126 and the valve member 128 isolate a volume above the valve seat 130 and the outlet port 134 and below the valve member 128 from a fluid chamber 140 located above the valve member 128.

The fluid chamber 140 is located above the valve member 128 and below a stem portion 110 of the solenoid plunger 102. The stem portion 110 of the solenoid plunger 102 extends through an upper cage 124 disposed in the valve body 122 (i.e., typically screwed in) above the fluid chamber 140. Seals 127 located between the stem portion 110 and the upper cage 124 prevent fluid loss therebetween. In addition, the fluid chamber 140 is sealed by seals 125 between the upper cage 124 and the valve body 122, in addition to seals 123 and 129 previously described.

In certain embodiments, a spring 136 or other biasing mechanism may be disposed within the fluid chamber 140 to bias the valve member 128 to a closed position (i.e., to bias a bottom of the valve member 128 into contact with the valve seat 130) when the valve 120 is not in use. For example, the spring may be a coil, Belleville, or other type of spring known to those skilled in the art. In certain embodiments the spring 136 may provide a force of between about 1 and 5 pounds against the valve member 128.

Figure 3A:
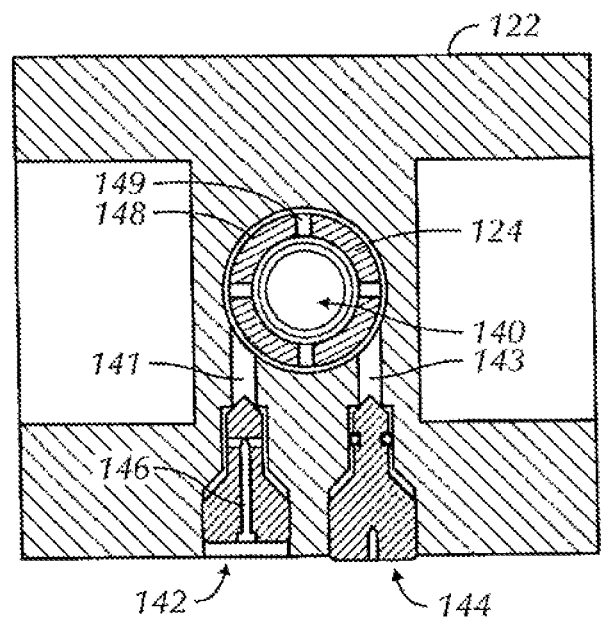
FIG. 3A illustrates a cross-section view of a fluid chamber of the valve shown in FIG. 2A in accordance with one or more embodiments of the present disclosure.

Referring now to FIG. 3A, a cross-section view of the fluid chamber 140 in accordance with one or more embodiments of the present disclosure is shown. The fluid chamber 140 may be filled with an incompressible fluid (e.g., hydraulic fluid) through a bore in the upper cage 124 prior to coupling the solenoid 100 to the valve body 122. In other embodiments, the fluid chamber 140 may be filled with hydraulic fluid through a first port 141 in which a bleed screw 142 is installed, or a second port 143 in which a solenoid adjustment screw 144 is installed. Hydraulic fluid reaches the fluid chamber 140 through the first and second ports 141 and 143, which communicate with one or more orifices 149 of the upper cage 124 and disposed adjacent an annular recess 148 formed in the valve body 122.

The bleed screw 142 has a bleed channel 146 formed therein through which fluid may flow out from the fluid chamber 140 when the bleed screw 142 is unseated. The solenoid adjustment screw 144 is used to adjust the travel of the solenoid plunger 102 and prevent the solenoid plunger 102 from contacting the solenoid 100 when the valve 120 is closed. In certain embodiments, the solenoid adjustment screw 144 may include a lock nut (not shown) or other locking device that is tightened after the solenoid adjustment screw 144 is fully seated. Operation of the bleed screw 142 and solenoid adjustment screw 144 is described in detail below.

To relieve fluid from the fluid chamber 140, both the bleed screw 142 and solenoid adjustment screw 144 may be turned outward one or two turns off their seated positions in the first and second ports 141 and 143. While one or two turns are given as an example, those skilled in the art will appreciate that any number of turns may be used to unseat the solenoid adjustment and bleed screws. While setting the bleed and solenoid adjustment screws, the valve member 128 remains in contact with the valve seat 130 in the lower cage 126 (i.e., in a closed position). The bleed screw 142 allows excess hydraulic fluid to escape from the fluid chamber 140 as the stem portion 110 of the solenoid plunger 102 is moved toward the fluid chamber 140 and displaces hydraulic fluid (which occurs when the solenoid 100 is coupled to the valve body 122. Once the visual indicator 104 of the solenoid plunger 102 is positioned on top of the solenoid 100, and any excess hydraulic fluid has escaped from the fluid chamber 140, the bleed screw 142 may be returned to a fully seated position by turning the bleed screw 142 back in to the first port 141. The fully seated bleed screw 142 locks the hydraulic fluid in the fluid chamber 140.

Figure 2B:
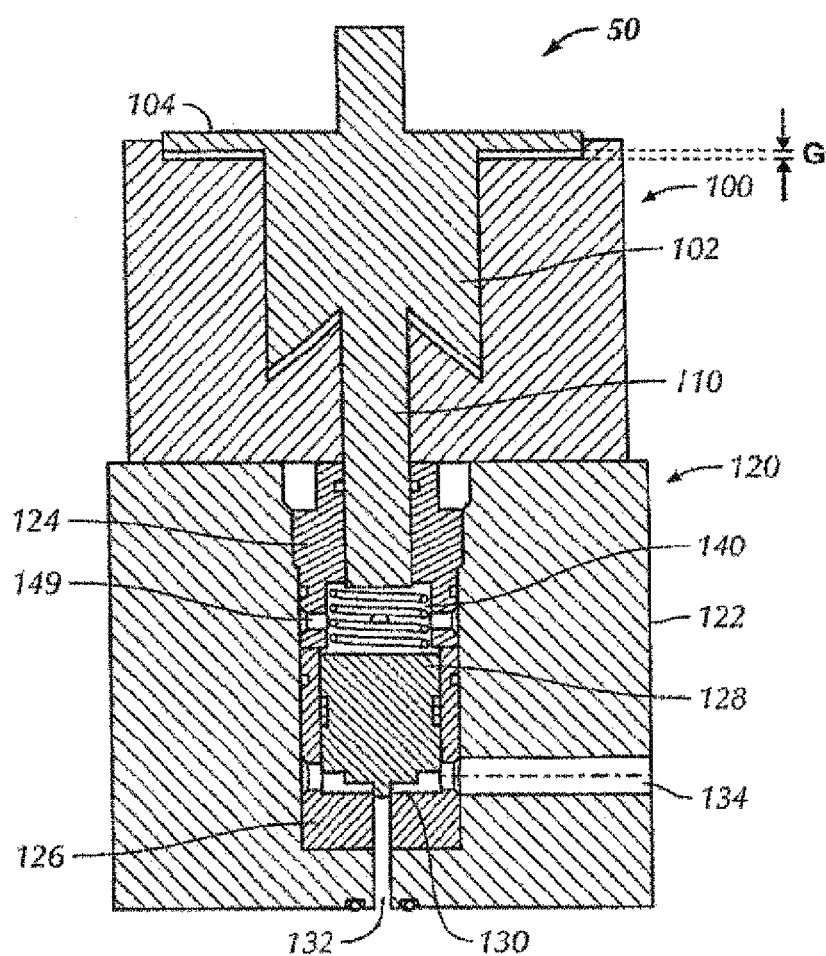
FIG. 2B illustrates a cross-section view of the solenoid actuator and valve shown in FIG. 1B in a final assembled position in accordance with one or more embodiments of the present disclosure.

After the bleed screw 142 is returned to a fully seated position, the solenoid adjustment screw 144 may also be returned to a fully seated position (i.e., turned inward to seat) to set the travel of the solenoid plunger 102. Moving the solenoid adjustment screw 144 inward to a seated position displaces hydraulic fluid in the second port 143 back against the stem portion 110 of the solenoid plunger 102, causing the solenoid plunger 102 to move upward and move the visual position indicator 104 slightly off (illustrated by gap "G") the solenoid 100, as shown in FIG. 2B.

Fully seating the solenoid adjustment screw 144 and lifting the visual indicator 104 off the solenoid 100 by a certain amount (gap G) provides an indication that the solenoid plunger 102 is appropriately adjusted. Properly adjusted, the visual indicator 104 will not contact the solenoid 102 (or "bottom out"), thus preventing the solenoid 102 from losing effectiveness in applying force against the valve member 128 in a closed position. In certain embodiments, the visual position indicator 104 may be moved between 0.015 and 0.045 of an inch off the solenoid 100. In other embodiments, the distance G may be about 0.030 of an inch.

Figure 3B:
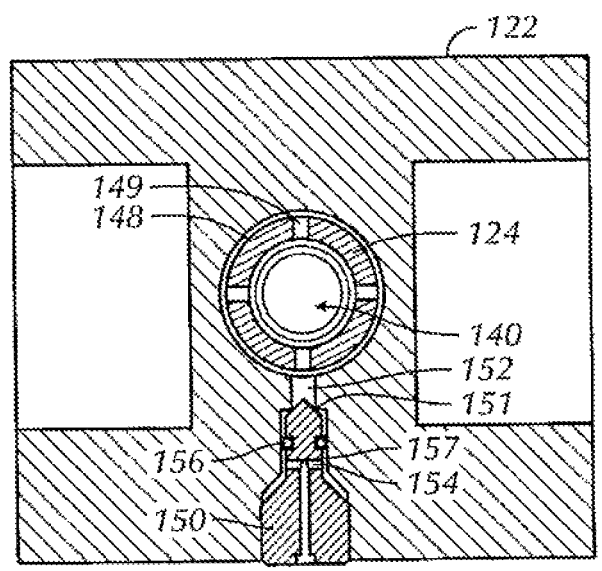
FIG. 3B illustrates a cross-section view of a fluid chamber of the valve shown in FIG. 2A in accordance with one or more embodiments of the present disclosure.

Referring briefly to FIG. 3B, other embodiments disclosed herein may include a solenoid adjustment/bleed screw 150 which incorporates both features of a bleed screw and a solenoid adjustment screw. The solenoid adjustment/bleed screw 150 is installed in a single port 152 in fluid communication with the fluid chamber 140. The solenoid adjustment/bleed screw 150 has a bleed channel 154 formed therein and, in addition, an O-ring located ahead of the bleed channel 154. Fluid may flow from the fluid chamber 140 through the bleed channel 154 when the adjustment/bleed screw 150 is positioned such that it is out of contact from seat 151 (i.e., unseated) and the O-ring 156 is not engaged in bore 157.

In one example, the solenoid adjustment/bleed screw 150 may be turned outward four turns and unseated from seat 151, which moves the O-ring 156 out of contact with bore 157 in port 152 to allow fluid to escape through the bleed channel 154 from the fluid chamber 140. Once excess hydraulic fluid is removed from the fluid chamber 140, the solenoid adjustment/bleed screw 150 may then be turned inward two turns, which moves O-ring 156 back into sealing contact with bore 157 in port 152 so that hydraulic fluid is locked in the fluid chamber 140. Finally, the solenoid adjustment/bleed screw 150 may be turned in an additional two turns to fully seat the solenoid adjustment/bleed screw 150 on the seat 151. The fully seated solenoid adjustment/bleed screw 150 displaces hydraulic fluid in the fluid chamber 140 to move the visual indicator 104 (FIG. 2B) off the solenoid 100. Those skilled in the art will appreciate that the number of turns of the solenoid adjustment/bleed screw 150 may be varied and still accomplish both the bleed and solenoid adjustment functions.

Once the hydraulic fluid is locked within the fluid chamber 140, force provided by the solenoid 100 may be transferred through the hydraulic fluid and multiplied against a surface of the valve member 128 exposed to the fluid chamber 140. The force multiplication is accomplished by the surface area differences between the stem portion 110 of the solenoid plunger 102 and the valve member 128. As shown in FIG. 2A, the valve member 128 has a surface area exposed to the fluid chamber 140 that is larger than a surface area of the stem portion 110 exposed to the fluid chamber 140. Therefore, a force multiplying effect is created between the stem portion 110 of the solenoid plunger 102 and the valve member 128 surfaces exposed to the fluid chamber 140.

For example, in one embodiment, a surface area of the stem portion 110 exposed to the fluid chamber 140 may be one-fourth a surface area of the valve member 128 exposed to the fluid chamber, which provides a 4:1 force multiplying ratio between the surfaces. With a 4:1 force multiplying ratio, a force generated by the solenoid actuator 100 provides a force that is approximately 4 times greater between the valve member 128 and the valve seat 130. While a 4:1 force multiplying ratio is illustrated as an example, one of ordinary skill in the art will appreciate that other force multiplying ratios between surface areas of the stem portion 110 and the valve member 128 exposed to the fluid chamber 140 may be used depending on the application and the force multiplying effect desired. For example, a 2:1 force multiplying ratio or greater may be used in accordance with one or more embodiments disclosed herein. In other embodiments, a 1.25:1 force multiplying ratio or greater may be used.

Figure 2C:
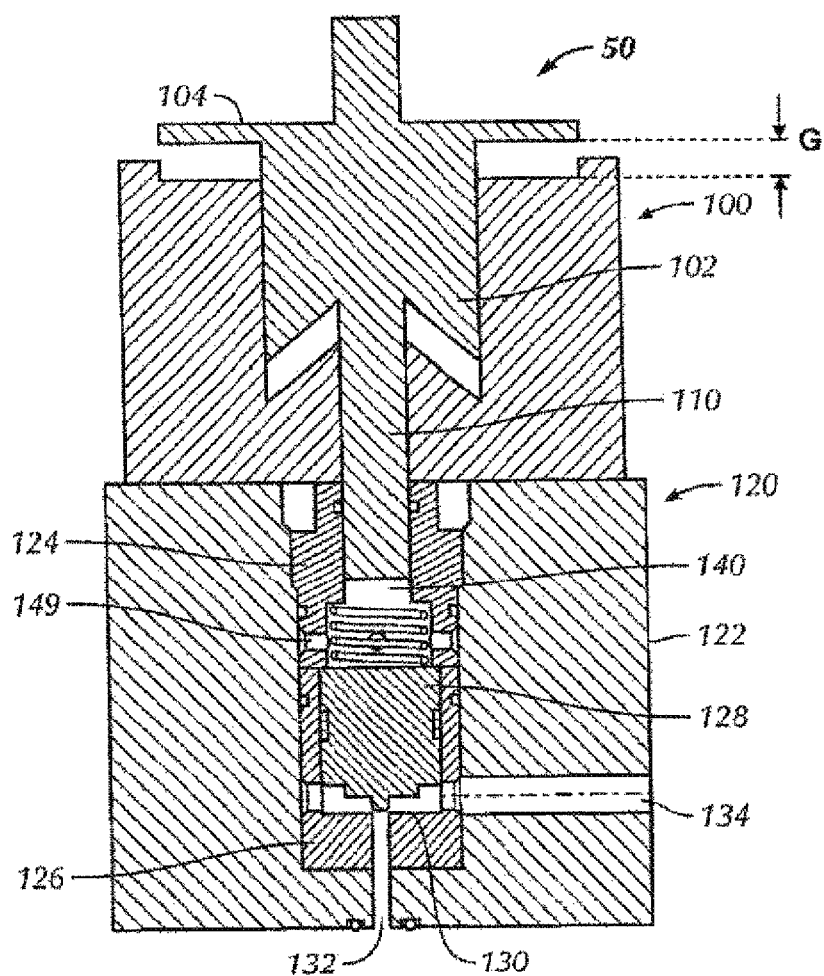
FIG. 2C illustrates a cross-section view of the solenoid actuator and valve shown in FIG. 1B in an open position in accordance with one or more embodiments of the present disclosure.

Methods of assembling the solenoid actuated valve assembly 50 are described in reference to FIGS. 2A-2C in accordance with one or more embodiments of the present disclosure. Initially, the valve member 128 is maintained in the closed position against the valve seat 130 while filling the fluid chamber 140 with hydraulic fluid. The fluid chamber 140 is filled with hydraulic fluid through a bare in the upper cage 124 and the solenoid 100 is that coupled to the valve body 122.

The bleed screw 142 and solenoid adjustment screw 144 are unseated (e.g., turned outward) as the solenoid 100 is coupled to the valve body 122 to allow excess hydraulic fluid in the fluid chamber 140 to be relieved through the bleed screw 142 (FIG. 3A). The visual indicator 104 will sit flush on the solenoid 100 when all excess hydraulic fluid is out. The bleed screw 142 is then turned inward and returned to a fully seated position to lock hydraulic fluid in the fluid chamber 140. After the bleed screw 142 is fully seated, the solenoid adjustment screw 144 is turned inward to a fully seated position, which causes the visual indicator 104 to lift off the solenoid 100 a distance G (FIG. 2B) due to displacement of the hydraulic fluid locked in the fluid chamber 140. FIG. 2B represents the solenoid actuated valve assembly 50 in a final position after assembly.

Once assembled, the solenoid 100 may be energized to cause the solenoid plunger 102 to provide a force against the hydraulic fluid in the fluid chamber 140. The force is transferred through the hydraulic fluid in the fluid chamber 140 and against the valve member 128. The force applied against the valve member 128 is multiplied according to the force multiplying ratio provided between surface areas of the solenoid plunger 102 and valve member 128 exposed to the fluid chamber 140. As long as the solenoid 100 is energized, the valve member 128 will remain seated against the valve seat 130 and inlet port 132 will remain closed to prevent fluid communication between the fluid inlet 132 and outlet 134. In certain embodiments, the solenoid actuated valve assembly 50 may be closed against fluid pressures present in the inlet port 132 of up to 20,000 psi.

To open the valve, as shown in FIG. 2C, the solenoid 100 may be de-energized. With no downward force provided from the solenoid 100, the pressure in the inlet port 132 forces the valve member 128 upward to allow fluid flow from the inlet port 132 to the outlet port 134. The solenoid plunger 102, in turn, is forced upward by a distance which corresponds to the force multiplying ratio. For example, for a 4:1 force multiplying ratio, the solenoid plunger 102 is forced upward by a distances that is four times greater than the travel of the valve member 128 in the lower cage 126. Upward movement of the visual indicator 104 gives a positive indication that the valve 120 is open. The valve 120 may be opened and closed by alternately energizing and de-energizing the solenoid 100.

Advantageously, embodiments of the present disclosure provide a compact solenoid actuated valve assembly that is capable of closing against very high fluid pressure without requiring larger, more complex pneumatic or hydraulic actuator systems. Overall, the size, weight, and complexity of the solenoid actuated valve is reduced and requires less assembly time. Further, because the volume of hydraulic fluid in the fluid chamber of the valve, rather than its pressure, retains the valve in a closed position, a high pressure fluid source is not required to operate the valve. Thus, response time of the valve is reduced because a high volume of fluid is no longer required to operate the actuator.

In addition, due to the force multiplying ratios provided between the valve member and the solenoid plunger, the valve itself does not need to generate sufficient force to counterbalance high pressures present in the fluid inlet. Therefore, the valve member can be relatively small and compact. Moreover, costs to the end user are decreased due to the simplicity of the actuator and because no separate pneumatic or hydraulic supply lines are required to operate the valve. Overall, the one or more embodiments disclosed herein provide a more compact, less expensive, more reliable solenoid actuated valve assembly capable of operating against pressures of up to about 20,000 psi, or higher.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A solenoid actuated valve assembly comprising:
    a valve body comprising:
        a fluid inlet and fluid outlet;
        a valve member disposed within the valve body, wherein a position of the valve member controls a fluid flow between the fluid inlet and fluid outlet;
        a fluid chamber above the valve member, wherein the fluid chamber is fluidly isolated from the fluid inlet and outlet;
        a bleed screw disposed in a first port in fluid communication with the fluid chamber, wherein the bleed screw includes a bleed channel therethrough;
        a solenoid adjustment screw disposed in a second port in fluid communication with the fluid chamber; and
    a solenoid actuator coupled to the valve body comprising:
        a solenoid plunger proximate the fluid chamber;
    wherein a force multiplying ratio of a surface area of the valve member exposed to the fluid chamber to a surface area of the solenoid plunger exposed to the fluid chamber is at least 1.5:1.

2. The solenoid actuated valve assembly of claim 1, further comprising a lower cage disposed in the valve body in which the valve member slides.

3. The solenoid actuated valve assembly of claim 2, wherein the lower cage comprises a valve seat that contacts the valve member.

4. The solenoid actuated valve assembly of claim 1, further comprising an upper cage positioned above the fluid chamber.

5. The solenoid actuated valve assembly of claim 4, wherein the upper cage comprises one or more ports spaced around a circumference thereof and positioned adjacent an annular groove of the valve body.

6. The solenoid actuated valve assembly of claim 1, further comprising:
    a visual indicator on an end of the solenoid plunger,
    wherein the solenoid adjustment screw is configured to set the visual indicator at a distance off the solenoid actuator of between about 0.015 and 0.045 of an inch.

7. The solenoid actuated valve assembly of claim 1, wherein the solenoid adjustment screw further comprises an O-ring.

8. The solenoid actuated valve assembly of claim 1, further comprising a valve seat in the valve body which contacts the valve member.

9. The solenoid actuated valve assembly of claim 1, further comprising a spring in the fluid chamber which biases the valve member in a first direction.

10. The solenoid actuated valve assembly of claim 1, further comprising:
    a visual indicator on an end of the solenoid plunger,
    wherein the solenoid adjustment screw is configured to set the visual indicator at a distance off the solenoid actuator greater than 0.015 of an inch.

11. A method for assembling a solenoid actuated valve, the method comprising:
    providing a valve comprising:
        a fluid inlet and fluid outlet;
        a valve member disposed within a valve body, wherein a position of the valve member controls a fluid flow between the fluid inlet and fluid outlet; and
        a fluid chamber above the valve member, wherein the fluid chamber is fluidly isolated from the fluid inlet and outlet;
    providing a solenoid actuator comprising:
        a solenoid plunger;
    positioning the valve member in a dosed position;
    filling the fluid chamber with hydraulic fluid;
    coupling the solenoid actuator to the valve body, wherein a stem portion of the solenoid plunger is positioned proximate the fluid chamber;
    relieving excess hydraulic fluid from the fluid chamber through a bleed screw port in the valve body; and
    adjusting a position of the solenoid plunger with a solenoid adjustment screw.

12. The method of claim 11, further comprising positioning a visual indicator on an end of the solenoid plunger at a distance of between about 0.015 and 0.045 of an inch off the solenoid actuator.

13. The method of claim 11, further comprising positioning a visual indicator on an end of the solenoid plunger at a distance greater than 0.015 of an inch off the solenoid actuator.

14. A method for using a solenoid actuated valve, the method comprising:
    providing the solenoid actuated valve comprising:
        a valve body comprising:
            a fluid inlet and fluid outlet;
            a valve member disposed within the valve body, wherein a position of the valve member controls a fluid flow between the fluid inlet and fluid outlet; and
            a fluid chamber above the valve member filled with hydraulic fluid, wherein the fluid chamber is fluidly isolated from the fluid inlet and outlet; and
        a solenoid actuator coupled to the valve, body comprising:
            a solenoid plunger proximate the fluid chamber;
    relieving excess hydraulic fluid from the fluid chamber through a bleed screw port in the valve body; and
    providing a multiplied force against the valve member,
    wherein the multiplied force corresponds with a force multiplying ratio of as surface area of the valve member exposed to the fluid chamber to a surface area of the solenoid plunger exposed to the fluid chamber.

15. The method of claim 14, wherein the force multiplying ratio is at least 1.5:1.

16. The method of claim 14, wherein providing a multiplied force further comprises energizing the solenoid actuator.

\* \* \* \* \*